United States Patent [19]

Bianco

[11] Patent Number: 5,789,007
[45] Date of Patent: Aug. 4, 1998

[54] METHOD AND APPARATUS FOR CONTROLLED RIPENING OF FRESH PRODUCE

[75] Inventor: Michael Bianco, Miami, Fla.

[73] Assignee: Cool Care, Ltd., Deerfield Beach, Fla.

[21] Appl. No.: 638,905

[22] Filed: Apr. 24, 1996

[51] Int. Cl.[6] .................... A23L 1/27; A23L 3/3409; A23B 7/144
[52] U.S. Cl. .................. 426/263; 99/468; 99/474; 426/419; 454/174; 454/175; 454/181; 62/329
[58] Field of Search ................ 99/467, 468, 473, 99/474, 475, 476; 426/418, 419, 49, 263; 454/118, 173, 174, 175, 176, 177, 178, 179, 180, 181; 62/239, 329

[56] References Cited

U.S. PATENT DOCUMENTS

| | | | |
|---|---|---|---|
| 839,689 | 12/1906 | Williams | 454/179 |
| 1,262,860 | 4/1918 | Smith . | |
| 1,410,719 | 3/1922 | Rea . | |
| 1,736,788 | 9/1929 | Huston . | |
| 1,927,100 | 9/1933 | Skinner | 454/173 |
| 1,939,957 | 12/1933 | Day . | |
| 2,079,304 | 5/1937 | Polderman . | |
| 2,279,847 | 4/1942 | Stebbins . | |
| 3,008,838 | 11/1961 | Brunsing et al. . | |
| 3,123,988 | 3/1964 | Richman . | |
| 3,184,862 | 5/1965 | Frank . | |
| 3,389,946 | 6/1968 | Nicolaus et al. . | |
| 3,638,450 | 2/1972 | Falk | 62/329 |
| 3,982,584 | 9/1976 | Spanoudis | 165/42 |
| 4,354,549 | 10/1982 | Smith | 165/62 |
| 4,426,923 | 1/1984 | Ohata | 99/468 |
| 4,566,377 | 1/1986 | van Buytene | 99/474 |
| 4,583,454 | 4/1986 | Huang et al. | 99/468 |
| 4,676,152 | 6/1987 | Tsuji et al. | 99/468 |
| 4,764,389 | 8/1988 | Labarge | 426/419 |
| 4,824,685 | 4/1989 | Bianco | 426/418 |
| 5,041,298 | 8/1991 | Wallace et al. | 426/418 |
| 5,203,256 | 4/1993 | Mueller | 99/475 |
| 5,373,780 | 12/1994 | Bianco | 99/475 |
| 5,419,153 | 5/1995 | Hartley | 62/408 |
| 5,438,917 | 8/1995 | Bolkestein et al. | 99/476 |
| 5,460,841 | 10/1995 | Herdeman | 426/419 |
| 5,475,926 | 12/1995 | Bolkestein et al. | 426/418 |
| 5,497,698 | 3/1996 | Bolkestein | 99/476 |
| 5,531,158 | 7/1996 | Perryman | 99/474 |
| 5,566,608 | 10/1996 | Vejdani et al. | 99/475 |

FOREIGN PATENT DOCUMENTS 2 651 645  3/1991  France .

OTHER PUBLICATIONS

F. G. Mitchell, Rene Guillou, R. A. Parsons, "Commercial Cooling Of Fruits And Vegetables," Division of Agricultural Sciences, University of California, 1972.
Advertisement for Interko Ripening Room Systems, undated.
Article on Dade Service Corp.'s Ultra Ripe Tarpless Pressurized Ripening System, undated.

*Primary Examiner*—Joseph W. Drodge
*Attorney, Agent, or Firm*—Kenyon & Kenyon

[57] ABSTRACT

A ripening room for controlled ripening of produce includes a chamber defined by a ceiling, a floor, and a plurality of walls connecting the ceiling and the floor. The chamber is configured to receive two rows of boxed produce that are spaced apart from each other to define an interstitial volume therebetween. Each row of produce is proximate and spaced apart from one of the walls to define a side airspace therebetween. The ripening room also includes an air control system for transferring air between the side airspaces and the interstitial volume and controlling the temperature of the transferred air. The side airspaces and the interstitial volume are generally enclosed to inhibit airflow therebetween except for airflow through the air control system and through openings in the produce boxes. The air control system transfers air from the interstitial volume to the side airspaces during one time period to form a low pressure plenum in the interstitial volume and high pressure plena in the side airspaces such that the pressure differential between the low and high pressure plena forces air to flow from the side airspaces to the interstitial volume through the produce boxes. The air control system is also capable of reversing the direction of airflow during another time period in order to reduce temperature variations in the produce.

42 Claims, 8 Drawing Sheets

METHOD AND APPARATUS FOR CONTROLLED RIPENING OF FRESH PRODUCE

FIELD OF THE INVENTION

The present invention relates generally to methods and apparatus for controlled ripening of fresh produce, particularly fresh fruit like bananas.

BACKGROUND OF THE INVENTION

Bananas and other fresh produce are typically transported from growing fields to a processing facility where they are placed in specially designed ripening rooms. These ripening rooms are provided with insulated, gas-tight wall and roof panels and include an air handling unit to control the circulation and temperature of the air within the ripening room. In this manner, the ripening of the fresh produce be controlled in accordance with a predetermined ripening schedule so that the fruit is properly ripened at the time it is scheduled for delivery to retail outlets. Ethylene gas may be dispersed into the ripening room at preselected times to enable further control of the ripening of the produce. The use of ripening rooms thereby facilitates the delivery of produce to retail outlets without the constraint of having to schedule delivery in accordance with the natural ripening process of the fruit. Use of ripening rooms also further obviates problems associated with accelerations and decelerations of the ripening process due to changing conditions during the transportation of the produce.

U.S. Pat. Nos. 4,824,685 and 5,373,780 disclose ripening rooms in which the produce is packed into unitized shipping modules comprising individual protective boxes that are block-stacked on pallets. The palletized produce is placed into ripening rooms having a floor, ceiling and front, rear and side walls of suitable dimensions to enclose two spaced rows of the palletized produce. The two rows are spaced apart from one another to define an interstitial volume between the rows. Sufficient spacing is also provided between the palletized produce and the ceiling and walls of the chamber to define an airspace around and above the produce.

A tarp is placed over the top and one end of the spacing between the two rows of palletized produce to generally seal off the interstitial volume from the airspace around and above the produce. Exhaust fans are arranged in a sealed relation at the opposite end of the spacing between the rows to withdraw air from the interstitial volume and thereby create a pressure differential between the tarp sealed interstitial volume and the airspace above and around the produce. Air is introduced into the airspace by an air handling unit. The air is forced by the pressure differential between the airspace and the low pressure interstitial volume to flow through openings in the sides of the boxes, circulate around the produce contained therein, and flow into the low pressure interstitial volume to be exhausted by the fans. In this manner, a forced air circulation flows throughout the produce load in the chamber. The temperature and flow rate of the air introduced into the chamber by the air handling unit can be varied to control the ripening rate of the produce.

OBJECTS AND SUMMARY OF THE INVENTION

One object of the present invention is to provide a ripening room with temperature controlled airflow that maintains produce kept therein at generally uniform temperatures, that is, it minimizes temperature variations throughout the produce resulting from the temperature controlled airflow.

Another object of the invention is to provide a ripening room that, when either fully or partially loaded, will include airspaces that can be quickly and easily enclosed to form high and low pressure plena to facilitate air flow through the produce.

A further object of the invention is to provide a ripening room that can be conveniently ventilated to periodically replace air used in the room.

These and other objects are achieved by a ripening room that includes a chamber defined by a ceiling, a floor, and a plurality of walls connecting the ceiling and the floor. The chamber is configured to receive two rows of boxed produce that are spaced apart from each other to define an interstitial volume therebetween. Each row of produce is proximate and spaced apart from one of the walls to define a side airspace therebetween. The ripening room also includes an air control system for transferring air between the side airspaces and the interstitial volume and controlling the temperature of the air. The side airspaces and the interstitial volume are generally enclosed to inhibit airflow therebetween except for airflow through the air control system and through openings in the produce boxes. The air control system transfers air from the interstitial volume to the side airspaces during one time period to thereby form a low pressure plenum in the interstitial volume and high pressure plena in the side airspaces such that the pressure differential between the low and high pressure plena forces air to flow from the side airspaces to the interstitial volume through the openings in produce boxes.

In accordance with a significant aspect of the invention, the air control system is capable of reversing the direction of airflow during another time period in order to reduce temperature variations in the produce. In the reversed airflow mode, the air control system transfers air from the side airspaces to the interstitial volume to thereby form a high pressure plenum in the interstitial volume and low pressure plena in the side airspaces such that the pressure differential between the low and high pressure plena forces air to flow from the interstitial volume to the side airspaces through the openings in produce boxes. By periodically reversing the direction of airflow, temperature variations in the produce resulting from the temperature controlled airflow can be substantially eliminated.

The ripening room includes two movable partitions that can be independently positioned at various locations along the length of the ripening room to generally seal the front ends of the side airspaces. The movable partitions enable the side airspaces to be conveniently enclosed when the ripening room is either fully or partially loaded.

The ripening room also includes a ventilation system for conveniently ventilating the room when desired.

BRIEF DESCRIPTION OF THE DRAWINGS

3

Like reference numerals denote like parts in the drawings.

DETAILED DESCRIPTION

A ripening room 10 in accordance with the present invention (as shown in FIGS. 1, 2, 3A and 3B) includes a floor 12, a rear wall 14, a ceiling 16, two sidewalls 18, 20 and a front wall 22. The front wall 22 is provided with a pair of doors (not shown) that can be opened to enable access to produce in the room 10. The floor, walls, doors and ceiling 12, 14, 16, 18, 20 and 22 are insulated and form a generally gas-tight chamber for treating produce to control its ripening as will be discussed below.

The ripening room 10 may optionally be mounted on wheels (not shown) and used as a transportable unit. Alternatively, it may be designed for use as a stationary unit.

Produce is moved into and out of the ripening room chamber through the doors at the front wall 22 in separate palletized loads 24. Each palletized load 24 comprises a plurality of protective boxes 26 to unitize and protect the produce. The protective boxes 26 are block-stacked on pallets 28 for easy handling during their loading into and removal from the ripening room 10. Each pallet 28 may be 40 inches by 48 inches with 48 protective boxes tightly block-stacked thereon. Each of the protective boxes 26 includes side openings 30, which correspond with similar openings in adjacent boxes 26 to facilitate airflow through the boxes 26.

Ripening rooms in accordance with the invention can be constructed in a variety of sizes depending on the maximum load capacity desired. The ripening room 10 shown in the drawings is sized to house (when fully loaded) two rows of palletized produce, each containing 10 palletized loads. The ripening room chamber has a height of 2.85 m, a width of 2.82 m, and a length of 13 m. As will be discussed further below, the ripening room 10 need not be fully loaded to be operational; it can be conveniently operated under a variety of partial loading conditions.

4

The ripening room 10 is equipped with five air control units 32 mounted on the ceiling centrally between the sidewalls 18, 20. The air control units 32 each include an air heater and air cooler 34 for controlling air temperature and two tube axial fans 36 for controlling airflow. For ripening rooms designed as transportable units, hydraulic motors are preferably used (instead of electric motors) to drive the fans. Hydraulic motors emit less heat and require less space than electric motors.

Each fan 36 of an air control unit 32 is positioned to provide air circulation to two palletized loads 24. The air control units 32 are each connected to two ducts 38, each of which extends toward an opposite sidewalls 18, 20.

The ceiling 16 is also equipped with lights 40 between adjacent air control units 32 to provide lighting in the ripening room chamber when needed.

Two stationary side baffles 42 extend along the length of the upper portion of the chamber, each parallel to and proximate one of the sidewalls 18, 20. The side baffles 42 extend downwardly from the ceiling 16 and have a height of about 87.5 cm. They are spaced apart from respective proximate sidewalls 18, 20 by a distance of about 20 cm. This gap forms a portion of a side airspace 44 that, as will be described further below, forms a high or low pressure plenum to facilitate air circulation in the chamber.

The ducts 38 leading from the air control units 32 are each connected to openings in one of the baffles 42 to enable air flow between the side airspaces 44 and the air control units 32.

Figure 1:
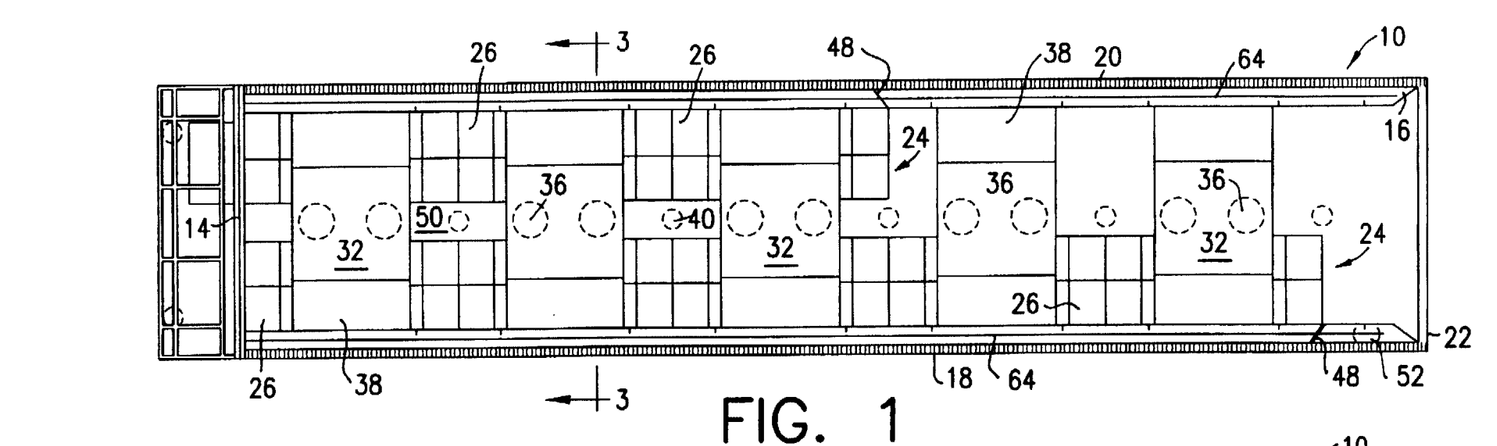
FIG. 1 is a top plan view of a ripening room in accordance with the present invention with the roof of the ripening room being cut away.
Figure 2:
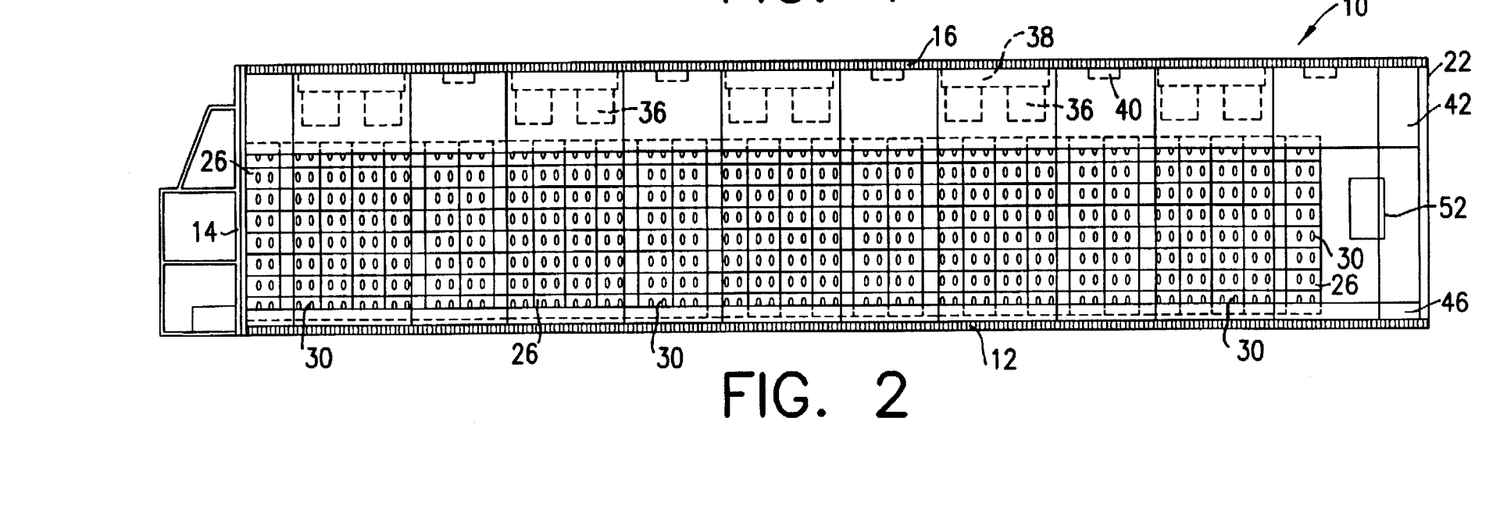
FIG. 2 is a side elevation view of the ripening room with a sidewall being cut away.
Figure 3A:
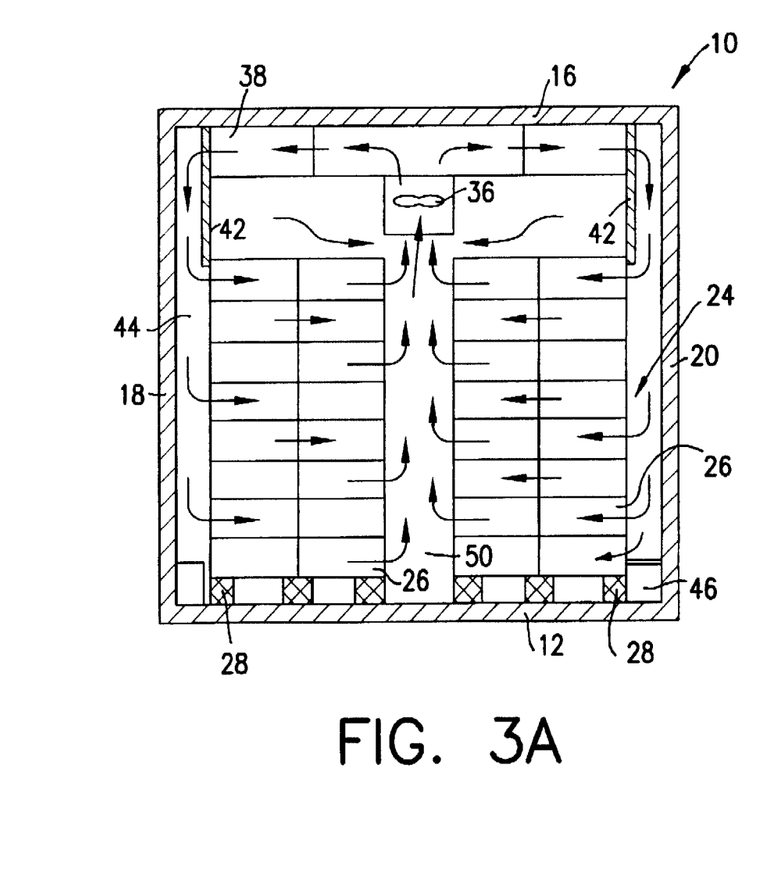
FIGS. 3A and 3B are enlarged cross-section views of the ripening room taken generally along line 3—3 of FIG. 1 illustrating possible airflow directions in the ripening room.
Figure 3B:
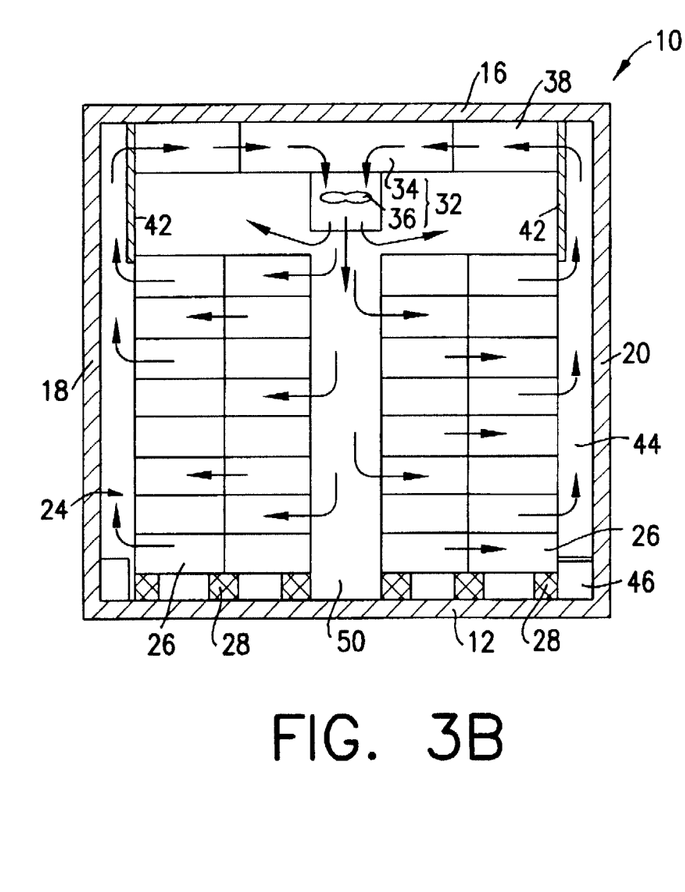
Figure 4:
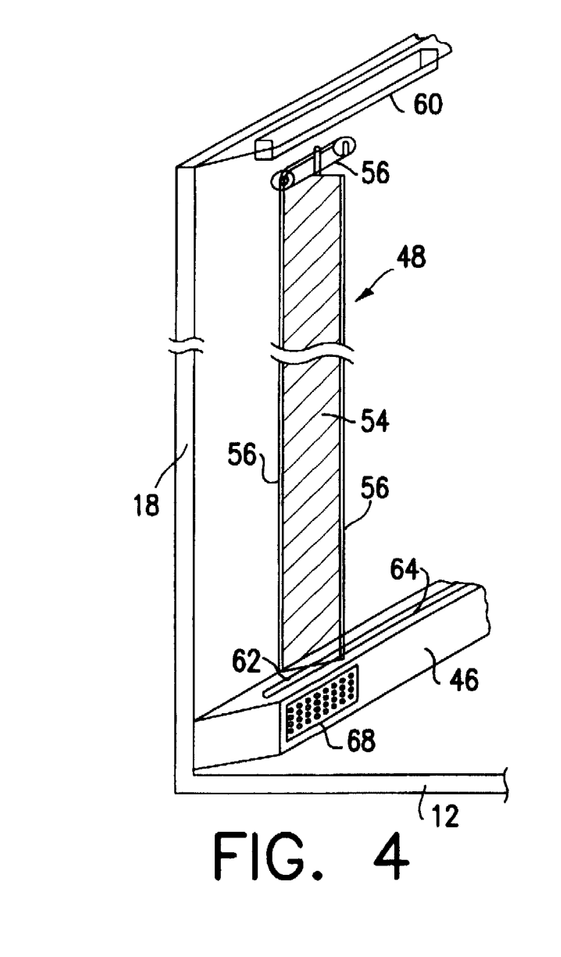
FIG. 4 is a perspective view of a movable partition of the ripening room.

The side airspaces 44 are further enclosed by the outer sides of the two rows of palletized loads 24 placed in the ripening room 10. As shown in FIGS. 3A and 3B, the palletized loads 24 are arranged in the chamber to abut the lower edge of each side baffle 42. The palletized loads 24 also abut metal curbs 46 on the floor-sidewall corners of the ripening room 10. (Metal curbs are preferably used in transportable ripening room units, while concrete curbs are preferred in stationary ripening room units.) The rear sides of the rearmost palletized loads 24 in the chamber abut the rear wall 14 of the ripening room 10.

Two movable partitions 48 (described in further detail below with respect to FIGS. 4–10) are also provided to enclose the front end of the side airspaces 44. Thus, the side airspaces 44 are defined by the baffles 42, the outer sides of the palletized produce, the floor curbs 46, the room sidewalls 18, 20, the room rear wall 14, and the movable partitions 48.

As shown in FIGS. 3A and 3B, the two rows of palletized produce in the ripening room 10 are spaced apart from each other. The space between and directly above the two rows of produce defines an interstitial airspace or volume 50. As will be described further below, the interstitial volume 50 forms a high or low pressure plenum to facilitate air circulation in the chamber.

In use, the fans 36 of the air control units 32 operate to transfer air at controlled airflow rates between the interstitial volume 50 and the side airspaces 44. The fans 36 can transfer air in two directions, that is, they can be operated to transfer air from the interstitial volume 50 to the side airspaces 44 during one time period as shown in FIG. 3A, and the fans can be operated in a reversed mode to transfer air from the side airspaces 44 to the interstitial volume 50 during another time period as shown in FIG. 3B. In the FIG. 3A airflow direction, the fans withdraw air from the interstitial volume 50 thereby creating a low pressure plenum therein and exhaust the air into the side airspaces 44, creating a high pressure plenum therein. This pressure differential causes air from the side airspaces 44 to circulate through the openings 30 in the protective boxes 26, around the produce contained therein, and into the interstitial volume 50 between the rows of palletized produce to then again be exhausted by the fans 36. The side baffle 42, the movable partitions 48, and the floor curbs 46 enclosing the side airspaces 44 enable substantially all of the forced airflow resulting from the pressure differential to flow through the openings 30 of the protective boxes 26 and accordingly, around the produce contained therein.

The pressure differential is thus efficiently utilized to uniformly circulate air throughout the produce load. The forced air circulation enables the temperature of the produce to be controlled through control of the airflow temperature by the air control units 32. The forced air circulation also enables effective treatment of the produce by ethylene or other gases used to further control ripening. (An ethylene generator 52 is located in the ripening room chamber to disperse ethylene gas into the chamber at preselected times.)

If the cooler is activated to circulate cool air through the produce, the difference in temperature between the cool air and the produce will cause air flowing through the produce to be heated between the entry and exit points in the produce. Thus, in the FIG. 3A airflow direction, after a period of time, produce near the side airspaces 44 will have lower temperatures than produce near the interstitial volume 50. To reduce these temperature differences, in accordance with the present invention, the direction of airflow is periodically reversed to that shown in FIG. 3B by reversing the direction of the fan blade rotation of the tube axial fans 36. In the FIG. 3B operation, the fans 36 withdraw air from the side airspaces 44 thereby creating low pressure plena therein and exhaust the air into the interstitial volume 50, creating a high pressure plenum therein. The pressure differential causes air from the interstitial volume 50 to circulate through the protective boxes 26, and into the side airspaces 44 to then again be exhausted by the fans 36. By periodically reversing the direction of airflow in this manner, the produce can be maintained at generally uniform temperatures.

When the ripening room 10 is only partially loaded, only the air control units 32 needed to circulate air to produce in the room are activated. Thus, if a particular air control unit 32 is not located above a palletized produce load 24, it is turned off to reduce energy consumption.

FIGS. 4–7 illustrate in greater detail one of the movable partitions 48, which generally seal the front end of the side airspaces 24. The movable partitions 48 each comprise an elongated generally rigid panel 54. The outer sides of the panels 54 are fitted with flexible resilient strips or sealing flaps 56 that generally sealingly engage the sidewalls 18, 20 and produce boxes 26 to inhibit airflow around the sides of the partitions 48. The panels 54 preferably comprise aluminum, and the sealing flaps 56 preferably comprise neoprene gasket material.

Figures 5A, 5B, 6, 7:
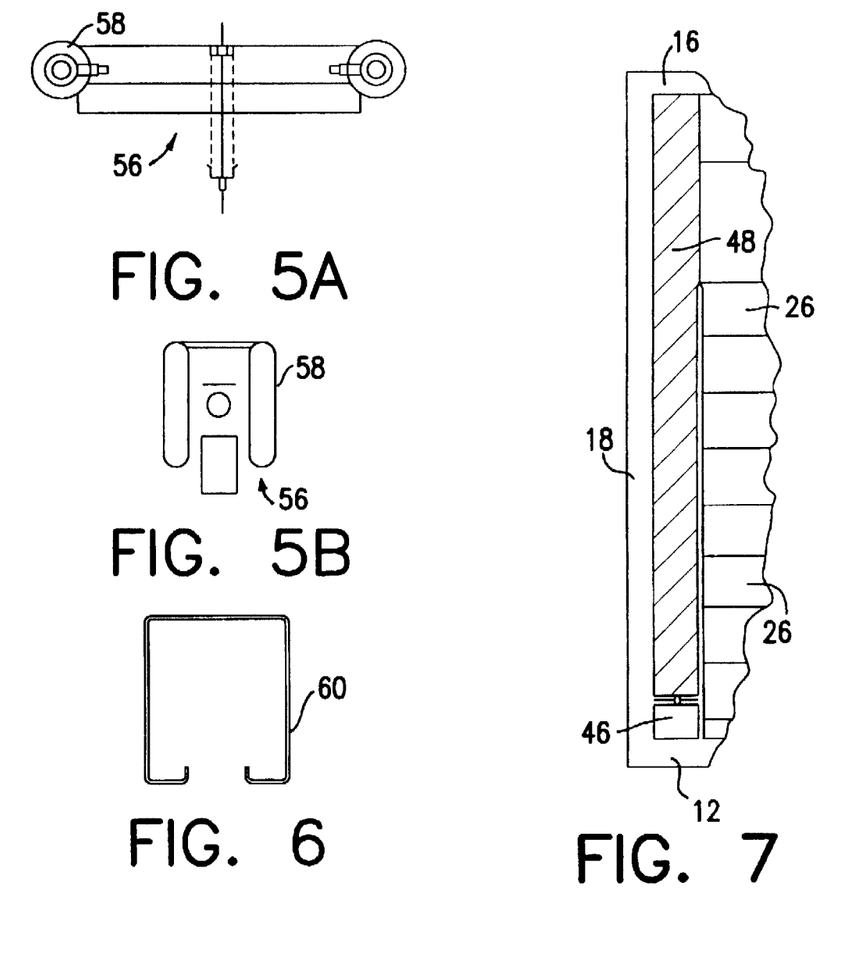
FIG. 5A is an enlarged side view of a wheel assembly of the movable partition.
FIG. 5B is a front view of the wheel assembly.
FIG. 6 is an enlarged front view of a railing in the ripening room onto which the wheel assembly is mounted.
FIG. 7 is a front view of the movable partition shown in a closed position.

The partitions 49 each include a wheel assembly 56 (shown in greater detail in FIGS. 5A and 5B) rotatably attached to the upper end of each panel 54. The wheel assembly 56 includes four wheels 58 that are movable along a track 60 mounted on the ceiling 16 of the ripening room 10. (A front view of the track 60 is shown in FIG. 6). The opposite bottom end of each panel 54 includes a plug member 62 extending therefrom that is slidingly mounted in a guide rail 64 located on one of the floor curbs 46. The partitions 48 can thereby be easily moved along the length of the ripening room 10.

The movable partitions 48 enable the front ends of the side airspaces 44 to be quickly and easily enclosed when the ripening room 10 is fully loaded or under a variety of partial loading conditions. For example, in FIG. 1, one of the rows of palletized produce is completely filled, while the other is only partially filled. The movable partitions 48 are independently positionable at the outer edge of the frontmost palletized produce load 24 in each row to enclose each side airspace 44.

Figure 8A:
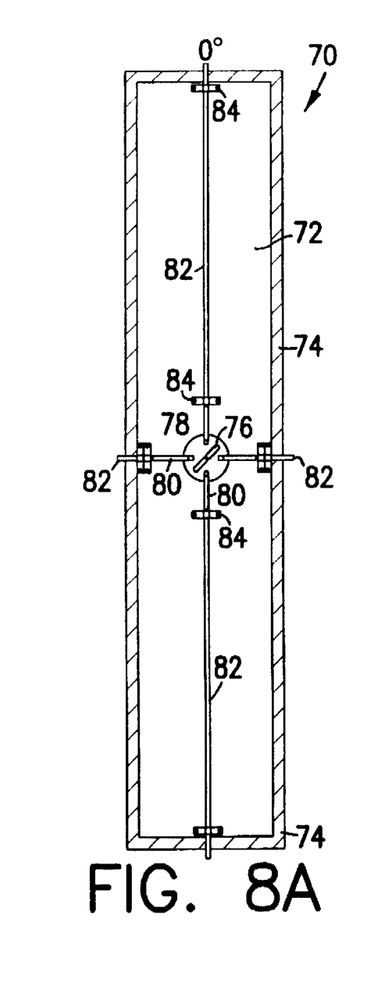
FIGS. 8A, 8B and 8C are front views of an alternative movable partition illustrating the operation of the actuating mechanism thereof.
Figure 8B:
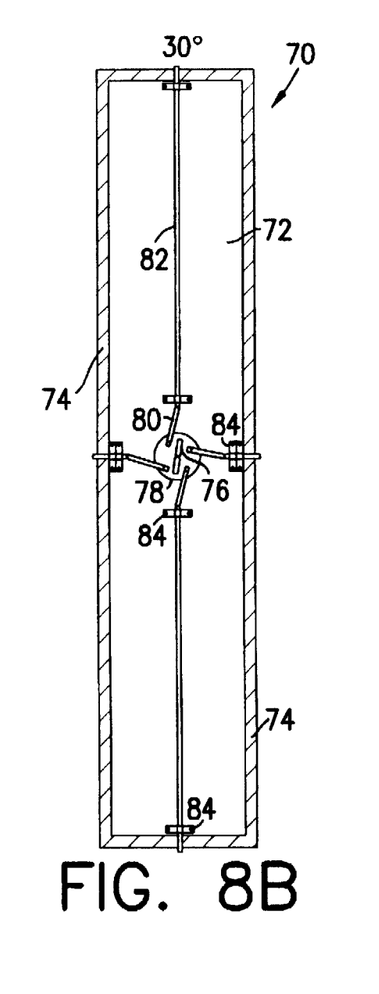
Figure 8C:
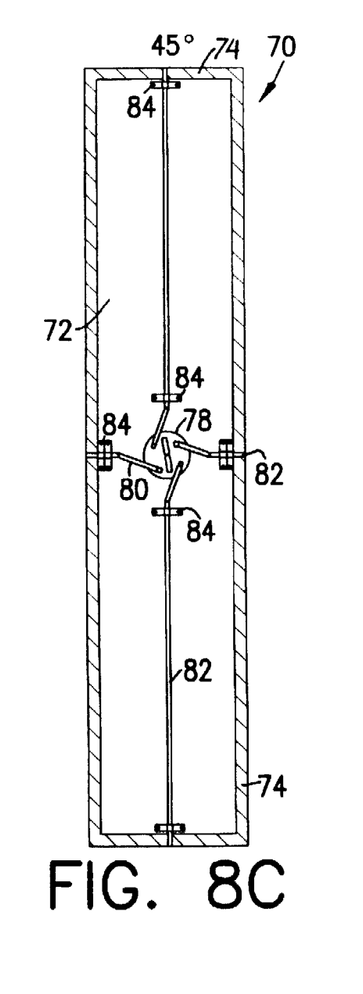

FIGS. 8A, 8B and 8C illustrate an alternative partition 70. The partition 70 includes a generally rigid panel 72 and a sealing flap 74 extending around the periphery of the panel 72. The flap 74 is movable between an extended use position and a collapsible transportable position. In the extended use position, the flap 74 is outwardly extended with respect to the panel 72 to sealingly enclose the side airspaces 44. In the collapsible position, the flap 74 is inwardly movable with respect to the panel 72 so that the partition 70 can be easily moved to another position along the length of the ripening room 10.

The sealing flap 74 can be moved between the collapsible position and the extended use position by means of an actuating mechanism that can be operated with a single hand. The actuating mechanism comprises a handle 76 rotatably mounted at the center of the panel 72, a handle base 78 fixedly connected to the handle 76, and four bars 80 each having one end pivotally connected to the base 78. The opposite end of each bar 80 is pivotally connected to one end of one of four rods 82. The rods 82 each slidably extend through two guides 84 attached to the panel 72. The opposite distal ends of the rods 82 are each attached to a portion of the flap 74 at one side of the panel 72. In FIG. 8A, the flap 74 is shown in an extended use position. The flap 74 can be made collapsible so that the partition 70 can be moved by turning the handle 76 counterclockwise as shown in FIGS. 10B and 10C. As the handle 76 is turned, the rods 82 are drawn inward toward the center of the panel 72, relieving tension in the flap 74. Therefore, in a single hand operation, the flap 74 can be moved between collapsible and extended positions.

Figure 9:
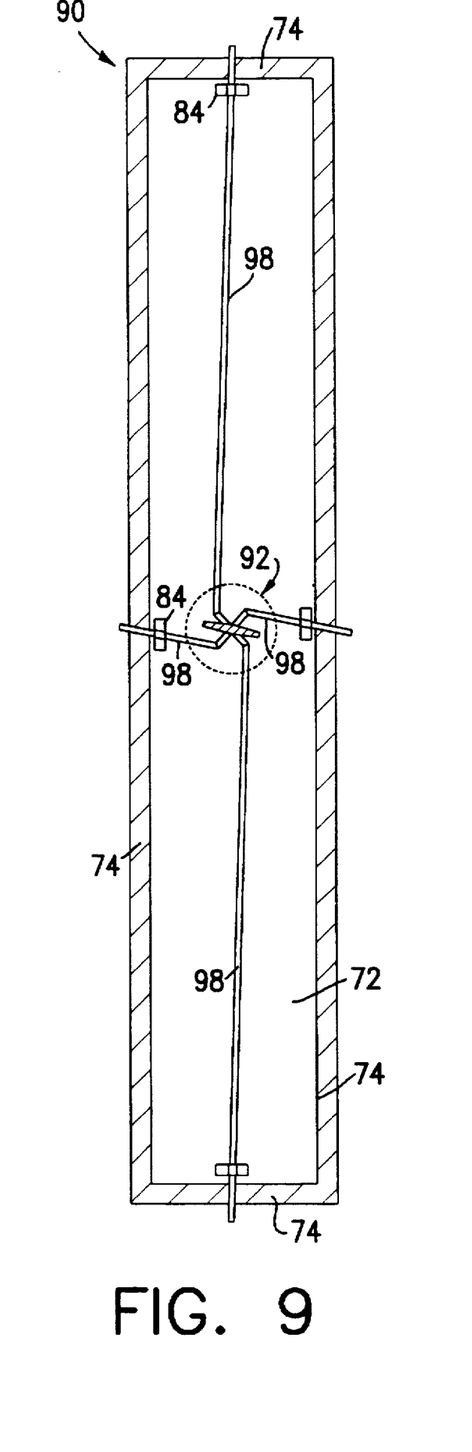
FIG. 9 is a front view of another alternative movable partition also in accordance with the invention.
Figure 10:
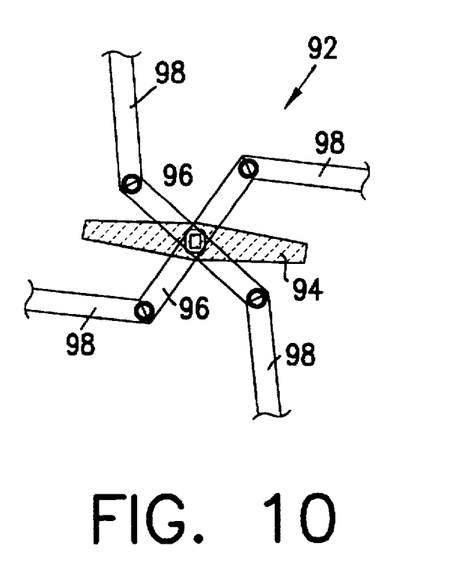
FIG. 10 is an enlarged front view of a portion of the actuating mechanism of the FIG. 9 movable partition.

FIGS. 9 and 10 illustrate a further alternate partition 90. The partition 90 is similar to the partition 70 of FIGS. 8A–C, but includes a modified actuating mechanism 92. The actuating mechanism 92 (shown in greater detail in FIG. 10) comprises a handle 94 rotatably mounted at the center of the panel 72, two extensions 96 fixedly connected to the handle 94, and four elongated rods 98 pivotally connected to ends of the extensions 96. The distal end of each rod 98 extends through a guide 84 at the center of an edge of the panel 72 and is attached to the flap 74. The opposite proximate ends of the rods 98 connected to the extensions 96 are off center with respect to the panel 72 such that when the handle 94 is turned in one direction (clockwise in the embodiment illustrated), the proximate ends of the rods 98 are drawn toward the panel center, and the sealing flap 74 is extended outward with respect to the panel 72. When the handle 94 is turned in the opposite direction, the proximate ends of the rods 98 are moved away from the panel center and the sealing flap 74 is pulled inward to a collapsible position. The actuating mechanism 92 thus conveniently enables the sealing flap 74 to be moved between extended and collapsible positions in a single hand operation.

During use of the ripening room 10, there will be a gradual buildup of ethylene, carbon dioxide and other gasses in the room chamber. Accordingly, the room chamber is provided with a ventilation system to periodically replace air in the chamber with fresh air. In many operations, the ventilation system can be operated for a half hour period twice a day to provide adequate ventilation.

Figure 11:
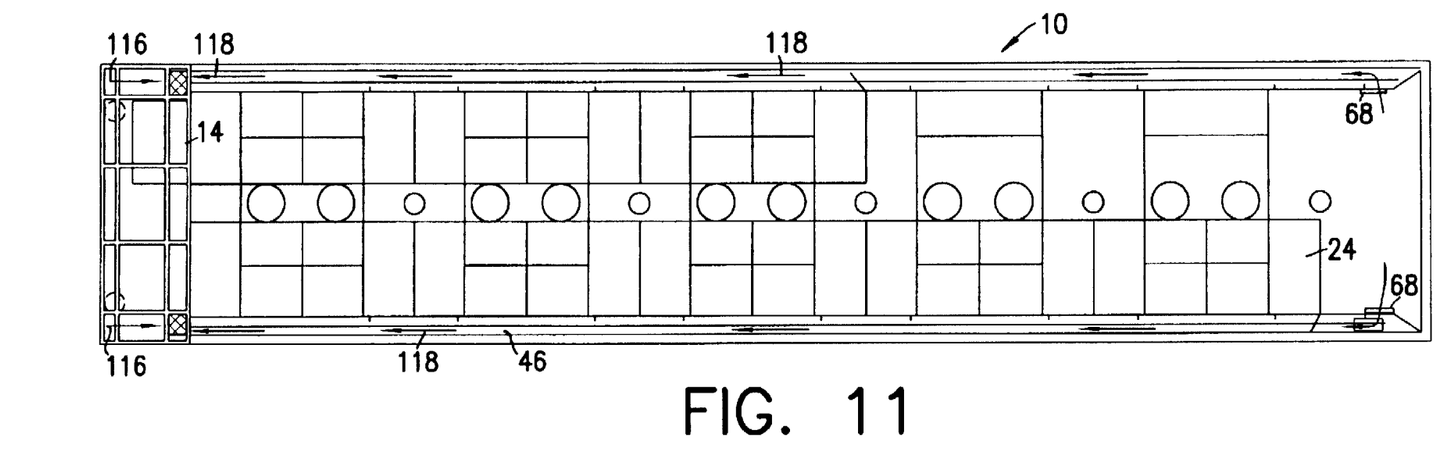
FIG. 11 is a top plan view of the ripening room with the roof being cutaway, illustrating the ventilation system therein.
Figure 12:
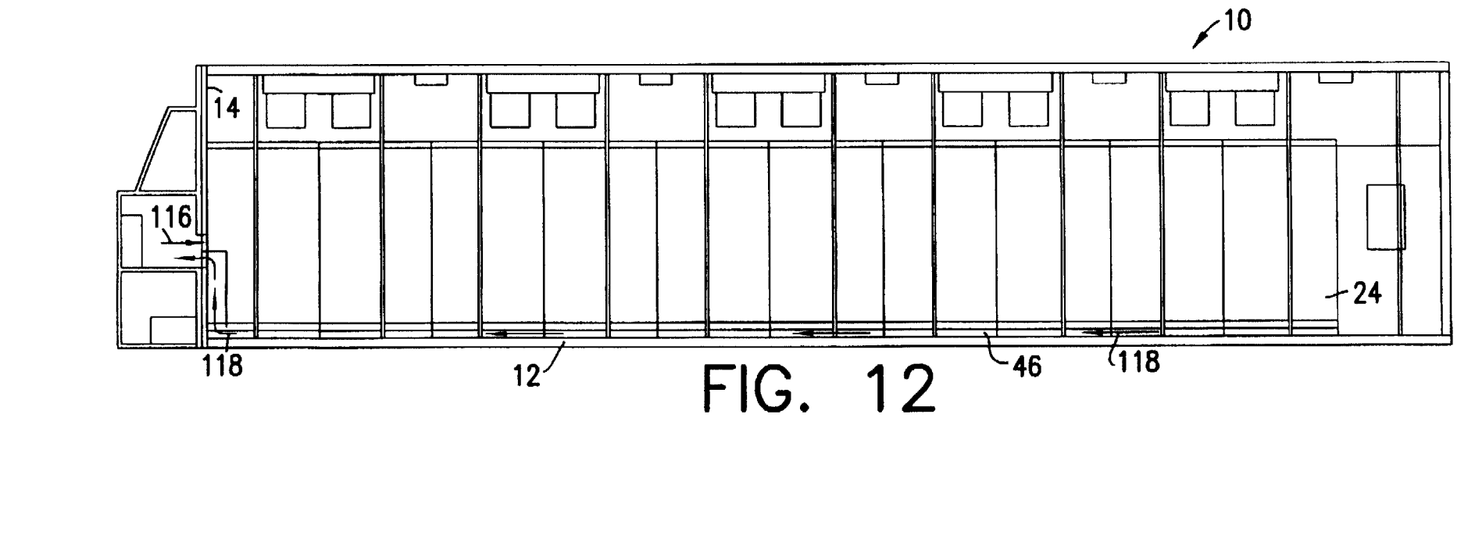
FIG. 12 is a side elevation view of the ripening room shown in FIG. 11 with a sidewall being cutaway.
Figure 13:
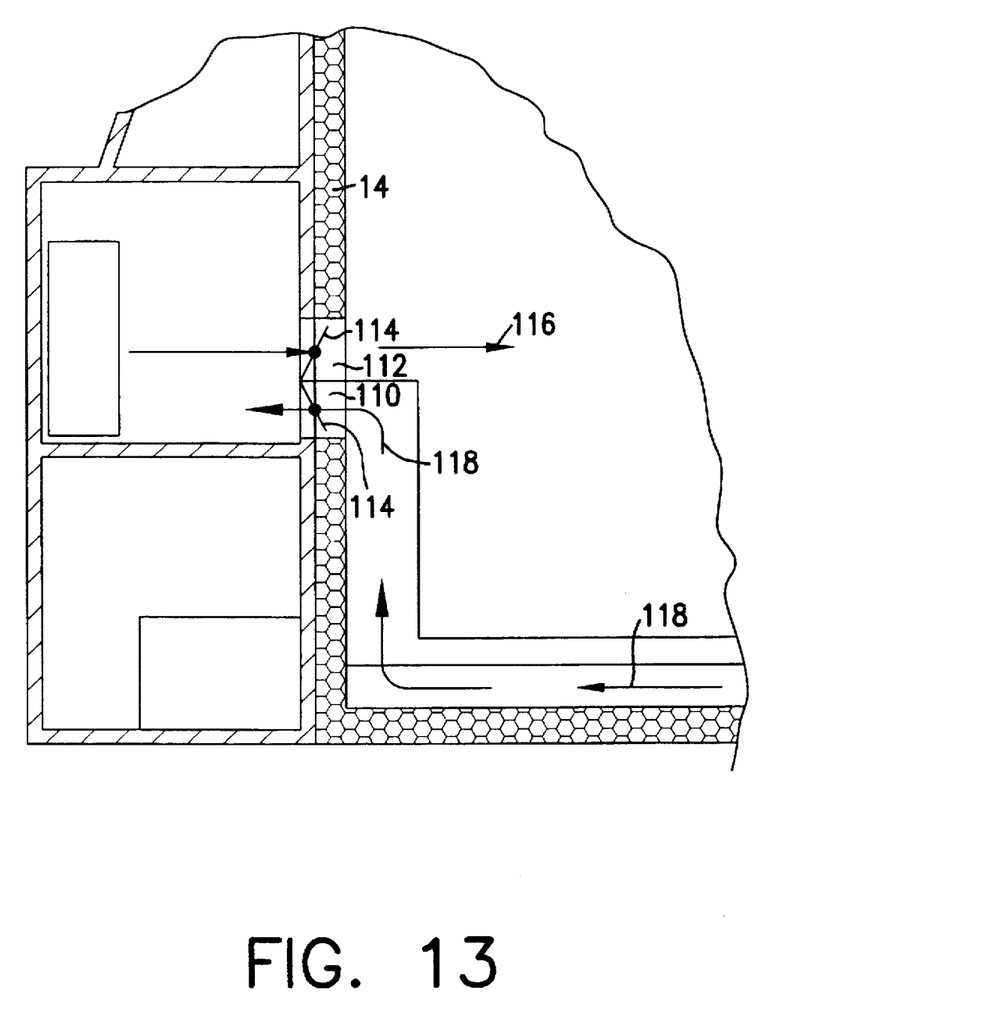
FIG. 13 is an enlarged view of a portion of FIG. 12, illustrating the inlet and exhaust ports of the ventilation system.

FIGS. 11–13 illustrate a ventilation system in accordance with the invention particularly suitable for transportable ripening rooms. The ventilation system includes two conduits, each extending along the length of the ripening room 10 through one of the hollow metal curbs 46 located on the floor-sidewall corners of the ripening room 10. The front end of each conduit leads to a perforated vent 68 (shown in FIG. 4) which is open to the interstitial volume 50. As shown in greater detail in FIG. 13, the opposite rear end of each conduit leads to a port 110 in the rear wall 14 that can be opened to air outside the ripening room. Another set of ports 112 are also provided in the rear wall 14 permitting airflow between the side airspaces 44 and air outside the ripening room. Each of the ports 110, 112 is equipped with a spring loaded damper 114 (schematically shown in FIG. 13) that in normal use of the room 10 is closed, but can be opened to enable air flow through the ports 110, 112.

When the tube axial fans 36 of the room 10 are operated in the FIG. 3A mode, a high pressure plenum will be formed in each of the side airspaces and a low pressure plenum will be formed in the interstitial volume. Accordingly, as shown in FIGS. 11–13, when the ports 110, 112 are opened, ports 112 act as intake ports enabling fresh air to be sucked therethrough into the low pressure interstitial volume 50 (indicated by airflow direction 116), and ports 110 act as exhaust ports enabling air in the high pressure side airspaces 44 to be released to the atmosphere (indicated by airflow direction 118).

When the fans 36 in the ripening room 10 are operated in a reversed mode (airflow in the direction shown in FIG. 3B) and the ports 110, 112 are opened for ventilation, ports 110 will act as intake ports and ports 112 will act as exhaust ports.

Figure 14:
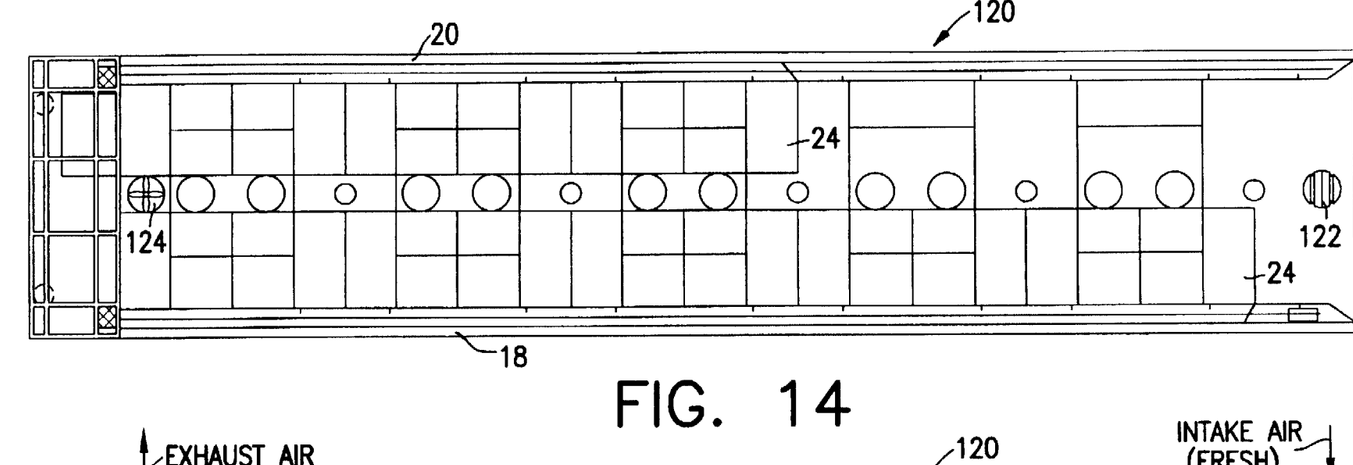
FIG. 14 is a top plan view of ripening room shown with the roof being cutaway equipped with an alternative ventilation system.
Figure 15:
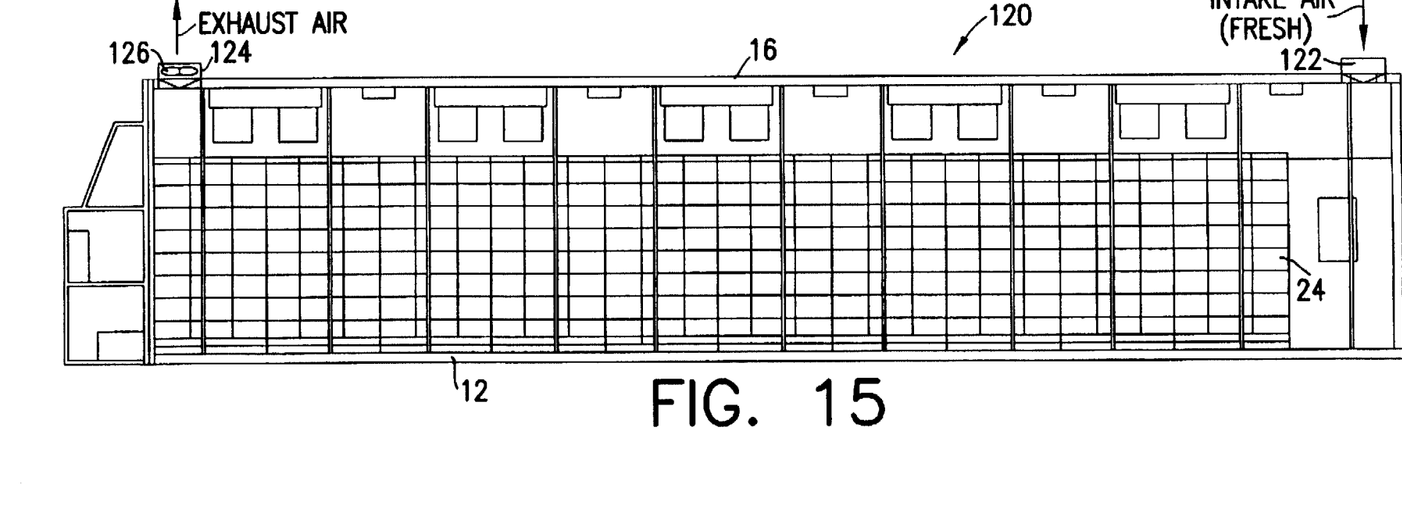
FIG. 15 is a side elevation view of the ripening room shown in FIG. 14 with a sidewall shown cutaway.

FIGS. 14 and 15 illustrate a ripening room 120 with an alternate ventilation system, particularly suited for use in stationary ripening rooms. The ventilation system includes an intake port 122 in the ceiling 16 at the front of the ripening room 120 enabling fresh air to flow into the chamber when the port 122 is opened. It also includes an exhaust port 124 in the ceiling 16 at the rear of the ripening room 120. The exhaust port 124 is equipped with an exhaust fan 126 for drawing air out of the chamber and releasing it into the atmosphere.

Although the ripening rooms shown in the drawings are designed for single-tiered pallet stacking, it should be understood that aspects of the present invention are also applicable to multi-tiered ripening rooms. In multi-tiered ripening rooms such as those disclosed in U.S. Pat. Nos. 5,373,780 and 4,824,685, a frame support structure or racking is provided to support two or more tiers of stacked palletized produce loads so that the quantity of produce that can be treated for a given amount of floor space is increased. The frame support structure enables the palletized produce to be arranged in two spaced apart rows, each of which is vertically stacked with one or more additional tiers of palletized produce. The tiers of palletized produce are vertically spaced-apart to facilitate loading and unloading of each tier. Intermediate baffles similar to the baffles 42 extend from the frame structure to seal the vertical spacing between the tiers so as to inhibit direct airflow between the side airspaces and the interstitial airspace through the vertical spacing.

Although the present invention has been described in terms of specific embodiments, various changes and modifications may be suggested to one skilled in the art. The invention is intended to encompass such changes and modifications as fall within the scope of the appended claims.

I claim:

1. An apparatus for controlled ripening of produce, comprising:
   a chamber defined by a ceiling, a floor, and a plurality of walls connecting said ceiling and said floor, said chamber configured to receive two rows of produce, said rows of produce being spaced apart from each other to define an interstitial volume therebetween, and each row of produce being proximate and spaced apart from a respective of said walls to define a side airspace therebetween;
   an air control system for transferring air between said side airspaces and said interstitial volume and controlling the temperature of said air; and
   means for inhibiting airflow between said side airspaces and said interstitial volume except for airflow through said air control system and through said produce, wherein said air control system includes means for transferring air from said interstitial volume to said side airspaces during one time period to form a low pressure plenum in said interstitial volume and high pressure plena in said side airspaces such that the pressure differential between the low and high pressure plena forces airflow from said side airspaces to said interstitial volume through said produce, and wherein said air control system also includes means for transferring air from said side airspaces to said interstitial volume during another time period to form low pressure plena in said side airspaces and a high pressure plenum in said interstitial volume such that the pressure differential between the low and high pressure plena forces airflow from said interstitial volume to said side airspaces through said produce.

2. The apparatus of claim 1, wherein said produce is stored in protective boxes that are block stacked on pallets.

3. The apparatus of claim 2, wherein each of said protective boxes includes side openings to permit air circulation therethrough.

4. The apparatus of claim 1, wherein said air control system includes at least one tube axial fan.

5. The apparatus of claim 4, wherein said air control system includes at least one hydraulic motor driving said at least one tube axial fan.

6. The apparatus of claim 1, wherein said air control system includes an air cooler for cooling air flowing therethrough.

7. The apparatus of claim 1, wherein said air control system includes a heater for heating air flowing therethrough.

8. The apparatus of claim 1, wherein said means for inhibiting airflow include side baffles partially enclosing said side airspaces.

9. The apparatus of claim 8, wherein said side baffles extend downwardly from said ceiling and abut sides of respective ones of said rows of produce.

10. The apparatus of claim 1, wherein said means for inhibiting airflow include partitions positioned between the produce and the walls for enclosing a front end of each of said side airspaces.

11. The apparatus of claim 10, wherein said partitions are movable along a length of said chamber.

12. The apparatus of claim 10, wherein said partitions each comprise an elongated panel and resilient sealing flaps fitted at sides of the panel.

13. The apparatus of claim 12, wherein said panels comprise aluminum and said sealing flaps comprise neoprene gasket material.

14. The apparatus of claim 10, wherein said partitions each comprise an elongated panel with a flexible resilient sealing flap positioned at each side of said panel.

15. The apparatus of claim 14, wherein said sealing flaps are adjustable between an extended use position in which said flaps extend outwardly from said panel and a collapsible transportable position.

16. The apparatus of claim 15, wherein said partitions each include an actuating mechanism to move said flaps between said extended and collapsible positions.

17. The apparatus of claim 16, wherein said actuating mechanism includes a handle rotatably mounted at the center of the panel, and a plurality of rods, each having one end connected to one of said flaps and an opposite end pivotally connected to an extension from said handle such that by rotating said handle the flaps are caused to be moved between said extended and collapsed positions.

18. The apparatus of claim 10, wherein said partitions each include a wheel assembly movably mounted on a track extending along a length of said chamber.

19. The apparatus of claim 18, wherein said track is mounted on said ceiling of said chamber.

20. The apparatus of claim 19, wherein said wheel assembly is rotatably connected to an upper end of said panel.

21. The apparatus of claim 20, wherein each partition includes a plug extending from a lower end of said partition, said plug being slidably mounted in a guide rail slot on a curb on the chamber.

22. The apparatus of claim 1, further comprising an ethylene generator for introducing ethylene gas in said chamber.

23. The apparatus of claim 1, further comprising ducts connected to said air control system for transferring air between said air control system and said side airspaces.

24. The apparatus of claim 1, wherein said air control system comprises a plurality of air control units mounted along said ceiling of said chamber, wherein said means for transferring air comprises two tube axial fans in each air control unit.

25. The apparatus of claim 1, further comprising a ventilation system for periodically exhausting air in the ripening room and intaking air from space exterior said chamber.

26. The apparatus of claim 25, wherein said ventilation system includes a port in one of said walls or said ceiling leading to each said side airspaces and a port in one of said walls or said ceiling leading to said interstitial volume, and wherein each of said ports is equipped with a spring loaded damper.

27. The apparatus of claim 26, wherein one of said ports is equipped with an exhaust fan to facilitate releasing air from the chamber into the atmosphere.

28. An apparatus for controlling the ripening of produce, comprising:

a chamber defined by a plurality of walls for receiving two rows of boxes containing said produce, said rows of boxes being spaced apart defining an interstitial airspace therebetween, and each row of boxes being spaced apart from a respective one of said walls defining a side airspace therebetween; and an air control system for transferring air between said side airspaces and said interstitial airspace and controlling the temperature of said air;

wherein said interstitial airspace is substantially sealed from said side airspaces to inhibit airflow between said airspaces and said interstitial volume except for airflow through said air control system and through openings in said boxes, wherein said air control system enables transfer of air from said interstitial volume to said side airspaces during one time period to form a low pressure plenum in said interstitial volume and a high pressure plena in said side airspaces such that the pressure differential between the low and high pressure plena forces airflow from said side airspaces to said interstitial volume through the openings in said boxes, and wherein said air control system enables transfer of air from said side airspaces to said interstitial volume during another time period to form low pressure plena in said side airspaces and a high pressure plenum in said interstitial volume such that the pressure differential between the low and high pressure plena forces airflow from said interstitial volume to said side airspaces through the openings in said boxes.

29. A method for controlling the ripening of produce, said produce being stored in boxes arranged in two rows in a chamber, said chamber being defined by a plurality of walls, said rows of boxes being spaced apart to define an interstitial volume therebetween, each row of boxes being spaced apart from one of said walls defining a side airspace therebetween, said interstitial volume being generally sealed from said side airspaces to inhibit airflow therebetween except for airflow through openings in said boxes, said method comprising the steps of:

(a) withdrawing air from said interstitial volume, thereby forming a low pressure plenum therein;

(b) cooling the air withdrawn from the interstitial volume;

(c) exhausting the cooled air to the side airspaces, thereby forming high pressure plena therein, wherein air pressure differences between the high and low pressure plena cause air in the side airspaces to flow through the openings in the boxes to the interstitial volume;

(d) repeating steps (a), (b), and (c) for a time period;

(e) reversing the direction of airflow during another time period in order to reduce temperature differences in said produce by withdrawing air from said side airspaces thereby forming low pressure plena therein; cooling the air withdrawn from the side airspaces; and exhausting the cooled air to the interstitial volume thereby forming a high pressure plenum therein, wherein air pressure differences between the high and low pressure plena cause air in the interstitial volume to flow through the openings in the boxes to the side airspaces.

30. The method of claim 29, wherein the steps of withdrawing air and exhausting air comprise withdrawing air and exhausting air using at least one tube axial fan.

31. The method of claim 29, further comprising the step of introducing ethylene gas in said chamber to further control ripening of said produce.

32. The method of claim 29, further comprising the step of thereafter ventilating said chamber.

33. An apparatus for controlling the ripening of produce, comprising:

a chamber defined by a plurality of walls for receiving two rows of boxes containing said produce, said rows of boxes being spaced apart defining an interstitial airspace therebetween, and each row of boxes being spaced apart from a respective one of said walls defining a side airspace therebetween;

an air control system for transferring air between said side airspaces and said interstitial airspace and controlling the temperature of said air; and means for substantially sealing said interstitial volume from said side airspaces to inhibit airflow between said airspaces and said interstitial volume except for airflow through said air control system and through openings in said boxes, such that when said air control system transfers air from said interstitial volume to said side airspaces, a low pressure plenum is formed in said interstitial volume and high pressure plena are formed in said side airspaces such that the pressure differential between the low and high pressure plena forces airflow from said side airspaces to said interstitial volume through the openings in said boxes, wherein said means for substantially sealing include two movable partitions positioned between the produce and the walls for enclosing front ends of each of said side airspaces.

34. The apparatus of claim 33, wherein said partitions are movable along a length of said chamber.

35. The apparatus of claim 33, wherein said partitions each comprise an elongated panel and two resilient flaps fitted at sides of the panel.

36. The apparatus of claim 33, wherein said partitions each include a wheel assembly movably mounted on a track extending along a length of said chamber.

37. The apparatus of claim 36, wherein said wheel assembly is rotatably connected to an upper end of said panel.

38. The apparatus of claim 37, wherein each partition includes a plug extending from a lower end of said partition, said plug being slidably mounted in a guide rail slot on a curb on the chamber.

39. The apparatus of claim 33, wherein said partitions each comprise an elongated panel with a resilient sealing flap positioned at each side of said panel.

40. The apparatus of claim 39, wherein said sealing flaps are adjustable between an extended use position in which said flaps extend outwardly from said panel and a collapsible transportable position.

41. The apparatus of claim 40, wherein said partitions each include an actuating mechanism to move said flaps between said extended and collapsible positions.

42. The apparatus of claim 41, wherein said actuating mechanism includes a handle rotatably mounted at the center of the panel, and a plurality of rods, each having one end connected to one of said flaps and an opposite end pivotally connected to an extension from said handle such that by rotating said handle the flaps are caused to be moved between said extended and collapsible positions.

* * * * *